United States Patent
Kawahito et al.

(10) Patent No.: US 7,546,591 B2
(45) Date of Patent: Jun. 9, 2009

(54) PROGRAM CONVERSION AND DATA PROCESSOR

(75) Inventors: Motohiro Kawahito, Sagamihara (JP); Akira Koseki, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 10/459,253

(22) Filed: Jun. 11, 2003

(65) Prior Publication Data

US 2004/0030423 A1 Feb. 12, 2004

(30) Foreign Application Priority Data

Jun. 13, 2002 (JP) ............................. 2002-173212

(51) Int. Cl.
*G06F 9/45* (2006.01)
(52) U.S. Cl. ........................ 717/148; 717/139; 717/140; 717/158
(58) Field of Classification Search ................. 717/136, 717/148
See application file for complete search history.

(56) References Cited

U.S. PATENT DOCUMENTS

| | | | | |
|---|---|---|---|---|
| 6,463,582 | B1 * | 10/2002 | Lethin et al. | 717/158 |
| 6,738,967 | B1 * | 5/2004 | Radigan | 717/146 |
| 6,745,384 | B1 * | 6/2004 | Biggerstaff | 717/156 |
| 6,895,580 | B2 * | 5/2005 | Bates et al. | 717/157 |
| 7,080,366 | B2 * | 7/2006 | Kramskoy et al. | 717/148 |

OTHER PUBLICATIONS

"ECE540S Optimizing Compilers", Jan. 2002. Online retrieved at <http://www.eecg.toronto.edu/~voss/ece540/>, pp. 1-45.*
"Open Research Compiler", Ju et al., Sep. 2002. Online retrieved at <ipf-orc.sourceforge.net/ORC-PACT02-tutorial.pdf>, pp. 1-64.*
Armstrong, "Next Generation JVM & Dynamic Compiler", JAVA World, Jul. 1998, vol. 2, No. 7, pp. 40-51.
Akira et al., "Formalization and Implementation of a Compiler Using SSA Form by Attribute Grammar Descriptions", IPSJ SIG Notes, 1998 vol. 98, No. 30, pp. 177-182.

* cited by examiner

*Primary Examiner*—Tuan Q Dam
*Assistant Examiner*—Thuy Dao
(74) *Attorney, Agent, or Firm*—Yee & Associates, P.C.; Lisa M. Yamonaco (57) ABSTRACT

Enhances program efficiency by performing optimization with reduced influence of an explicit instruction for adjusting an image of local variables of a code column executed by means of an interpreter and a compiled code column. An example embodiment, includes: setting code that is ignorable in predetermined transformation for a second code column among codes in a first code column, which affects transformation of the second code column; and performing predetermined transformation for the second code column by ignoring the code that is set to be ignorable, when an execution object of a program transitions from a first code column executed by means of an interpreter to a second compiled code column. It can further include generating a compensating code required for transforming a second code column including propagation of a copy instruction, and inserting the code into a first code column prior to transformation of the second code column.

2 Claims, 7 Drawing Sheets

```
1  for (each I ∈ Xfer   INSTRUCTION FROM THE
                         BEGINNING OF Xfer BB  )  {
2    if ( I = = IGNORABLE INSTRUCTION) {/* INSTRUCTION MARKED WITH "!" */
3      for ( each E ∈  EACH ELEMENT OF A SET FOR COPY PROPAGATION HAVING "OUTPUT OF I"
                       AS AN OUTPUT         )  {
4        if ( E IS COPY FROM VARIABLE TO VARIABLE )  {
5          if ( OUTPUT OF E ∈ IGNORE_VARs )  {
6            /*  E CAN PASS THROUGH{   */
7          } else {
8            KILL U=E
9          }
10       } else  { /* COPY FROM CONSTANT TO VARIABLE */
11         /*  E CAN PASS THROUGH{   */
12       }
13     }
14   } else {
15     USUAL PROCESS OF KILL
16   }
17 }
```

PROGRAM CONVERSION AND DATA PROCESSOR

FIELD OF THE INVENTION

The present invention is directed to program-compilation and conversion. It is more specifically directed to program conversion for program transformation between code columns in different execution environments.

BACKGROUND ART

Under an execution environment, such as a Java execution environment, where an interpreter and a dynamic compiler operate in conjunction with each other, an execution object of a program can transition from a code column executed by means of the interpreter to a compiled code column during an execution of a method, a unit of compilation. For example, a method involved in a loop process is compiled during the loop process and an execution object of a program transitions (loop-transitions) to an execution of a compiled code column. In this case, an operation for adjusting an image of local variables is required at a transition part between a part executed by means of an interpreter and a part executed in a compiled code column (a jump-in entry from an interpreter).

For just-in-time (JIT) compiler corresponding to IA-64, which is an architecture of 64 bit CPU from U.S. Intel Corporation, needs an implementation concept of a "variable type" to adjust an image of local variables of a code column executed by means of an interpreter and a compiled code column. For this reason, one has to generate and insert a copy instruction explicitly having a type within a basic block of a jump-in entry from an interpreter (referred to as Xfer BB hereinafter), i.e., a copy instruction with "definitions of a variable".

Figure 7:
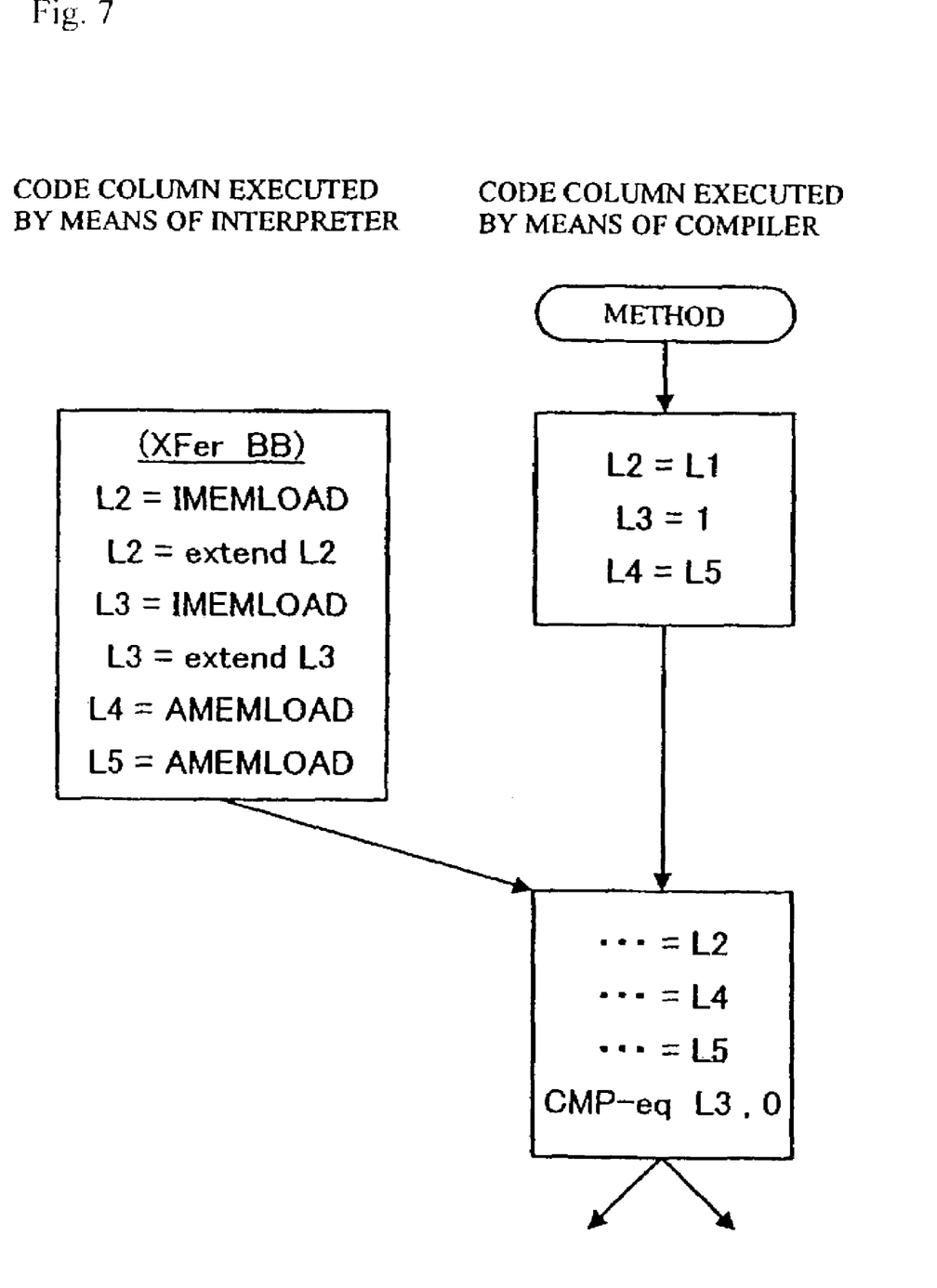
FIG. 7 is a diagram illustrating an example of an arrangement of code columns at a jump-in entry from an interpreter.

FIG. 7 is a diagram for showing an arrangement of code columns at a jump-in entry from an interpreter. In the example shown in FIG. 7, explicit instructions for adjusting images of local variables of a code column executed by means of an interpreter and a compiled code column, "L2=IMEMLOAD", "L2=extend L2", "L3=IMEMLOAD", "L3=extend L3", "L4=AMEMLOAD" and "L5=AMEMLOAD" are inserted into Xfer BB in a code column executed by means of an interpreter.

However, the explicit "definitions of a variable", which is inserted into a jump-in entry from an interpreter to adjust images of local variables of a code column executed by means of an interpreter and a compiled code column obstructed most optimization including program transformation (optimization) by means of a forward dataflow analysis or a UD (Use-Definition)-chain.

As a determination way of a variable type, the way of determining the type of a Live variable (in computer science, the live variable analysis is a classic data flow analysis performed by compliers to calculate for each program point the variables that may be potentially read afterwards before their next write update, that is, the variables that are live at the exit from each program point) by means of a backward data flow analysis at the end of Xfer BB is adopted. With this determination, however, the "type of a variable" for all local variables on a code column executed by means of an interpreter cannot be obtained. This further complicates the problem.

In the example shown in FIG. 7, the result of copy instructions "L2=L1", "L3=1", and "L4=L5" (L refers to a local variable, i.e., "L2=L1" means copying of a value of local variable L1 to local variable L2) at a basic block of a compiled code column before a junction of a code column executed by means of an interpreter and a compiled code column (simply referred to as "a junction" hereinafter) can be propagated to "... =L2", "... =L4", "CMP-eq L3, 0", etc. in the following basic block during optimization of a program. However, as instructions for adjusting images of the local variables L2, L3, L4, and L5 are written in Xfer BB of a code column executed by means of an interpreter, each of the above-mentioned copy instructions cannot be propagated in a forward dataflow analysis and the like.

One reason why optimization as a forward dataflow analysis cannot get across a junction, is that it is recognized that a value of a local variable is not yet decided in the optimization due to explicitly written instructions for adjusting images of the local variables in Xfer BB of a code column executed by means of an interpreter. For example, although a value of 1 is copied in local variable L3 in a compiled code column, the value in local variable L3 cannot be decided to be 1, because instructions "L3=IMEMLOAD" and "L3=extend L3" exist in Xfer BB.

A code column executed by means of an interpreter and a compiled code column are originally the same program. Thus, values of each local variable for a code column executed by means of an interpreter and for a compiled code column should also be the same at a junction. Therefore, an effect of optimization was unnecessarily arrested when an explicit instruction for adjusting images of a local variable, which is inserted into Xfer BB of a code column executed by means of an interpreter, stops optimization by means of a forward dataflow analysis or a UD-chain.

Although IA-64 has been described as an example here, it is also true for architectures of various CPUs other than 32-bit.

SUMMARY OF THE INVENTION

Therefore, the present invention enhances efficiency of a program by optimizing with reduced influence of an explicit instruction for adjusting an image of a local variable of a code column executed by means of an interpreter and a compiled code column.

One aspect of the present invention is implemented as a program conversion method. When an execution object of a program transitions between two code columns in different environments, the program conversion method includes: a step of setting code not to be considered in program transformation among codes before transition, which affect the program transformation on a transitioned code column; and a step of performing program transformation for a transitioned code column without considering the code that is set not to be considered.

Advantageously, the program conversion method further includes a third step of generating a compensating code required for transforming a second code column including propagation of a copy instruction and inserting the code into a first code column prior to transformation of the second code column, wherein transformation including the above-mentioned propagation of a copy instruction is performed for the second code column by ignoring an ignorable code in the second step. In this approach, insertion of a compensating code allows program transformation to be performed without considering any obstruction to propagation of a copy instruction at a junction of a first code column and a second code column.

Another aspect of the present invention is implemented as a data processor. The data processor includes: a compiler; and a program execution unit for executing a program with an interpreter in conjunction with a code compiled by a compiler. The compiler includes: setting means for setting a code that is ignorable in predetermined transformation among codes in a first code column, which affects transformation of a second code column, when an execution object of a program transitions from a first code column executed by means of an interpreter to a compiled second code column during a loop process; and program transformation means for performing predetermined transformation for the second code column by ignoring an ignorable code. The setting means and the program transformation means in this data processor are implemented in a computer (CPU) functioning as a compiler under program control.

BRIEF DESCRIPTION OF THE DRAWINGS

These and other aspects, features, and advantages of the present invention will become apparent upon further consideration of the following detailed description of the invention when read in conjunction with the drawing figures, in which.

| DESCRIPTION OF SYMBOLS | |
|---|---|
| 100 | compiler |
| 200 | program execution unit |
| 300 | memory |
| 400 | code generating device |
| 500 | storage |
| 600 | network |

DESCRIPTION OF THE INVENTION

The present invention provides methods, systems and apparatus to enhance efficiency of a program by optimizing with a reduced influence of an explicit instruction for adjusting an image of a local variable of a code column executed by means of an interpreter and a compiled code column.

In an example embodiment, the present invention is implemented as a program conversion when an execution object of a program transitions between two code columns in different environments. The program conversion method is characterized by including: a first step of setting a code not to be considered in program transformation among codes before transition, which affect the program transformation on a transitioned code column; and a second step of performing program transformation for a transitioned code column without considering a code that is set not to be considered.

In the example, when an execution object of a program transitions from a first code column executed by means of an interpreter to a second compiled code column, the program conversion method includes: a first step of setting a code that is ignorable in predetermined transformation for the second code column among codes in the first code column, which affects transformation of the second code column; and a second step of performing the predetermined transformation for the second code column by ignoring a code that is set to be ignorable.

More advantageously, an instruction code generated for performing transition between code columns and inserted into a code column before transition, more specifically, an instruction code for adjusting an image of variables in a first code column before transition and a second code column after transition is set to be ignorable (not to be considered) in program transformation.

More specifically, the second step includes: a step of determining whether a copy instruction can be propagated across a junction between the first code column and the second code column for each code in consideration of a variable contained in a code that is ignorable in predetermined transformation for the second code column; and a step of performing transformation of the second code column including propagation of a copy instruction on the basis of the determination.

In some embodiments, the program conversion method further includes a step of generating a compensating code required for transforming a second code column including propagation of a copy instruction and inserting the code into a first code column prior to transformation of the second code column, wherein transformation including the above-mentioned propagation of a copy instruction is performed for the second code column by ignoring an ignorable code in the second step. In this approach, insertion of compensating code allows program transformation to be performed without considering any obstruction to propagation of a copy instruction at a junction of a first code column and a second code column.

In some embodiments, the present invention is further implemented as a data processor including: a compiler; and a program execution unit for executing a program with an interpreter in conjunction with a code compiled by a compiler. The compiler generally includes: setting means for setting a code that is ignorable in predetermined transformation among codes in a first code column, which affects transformation of a second code column, when an execution object of a program transitions from a first code column executed by means of an interpreter to a compiled second code column during a loop process; and program transformation means for performing predetermined transformation for the second code column by ignoring an ignorable code. The setting means and the program transformation means in this data processor are implemented in a computer (CPU) functioning as a compiler under program control.

In some embodiments, the present invention is further implemented as a program for executing a process corresponding to each step in the above-mentioned program conversion method by controlling a computer, or as a program for causing a computer to function as the above-mentioned data processor. This program can be provided by distributing on a magnetic disc, an optical disc, a semiconductor memory, or other media or by delivering over a network.

Figure 1:
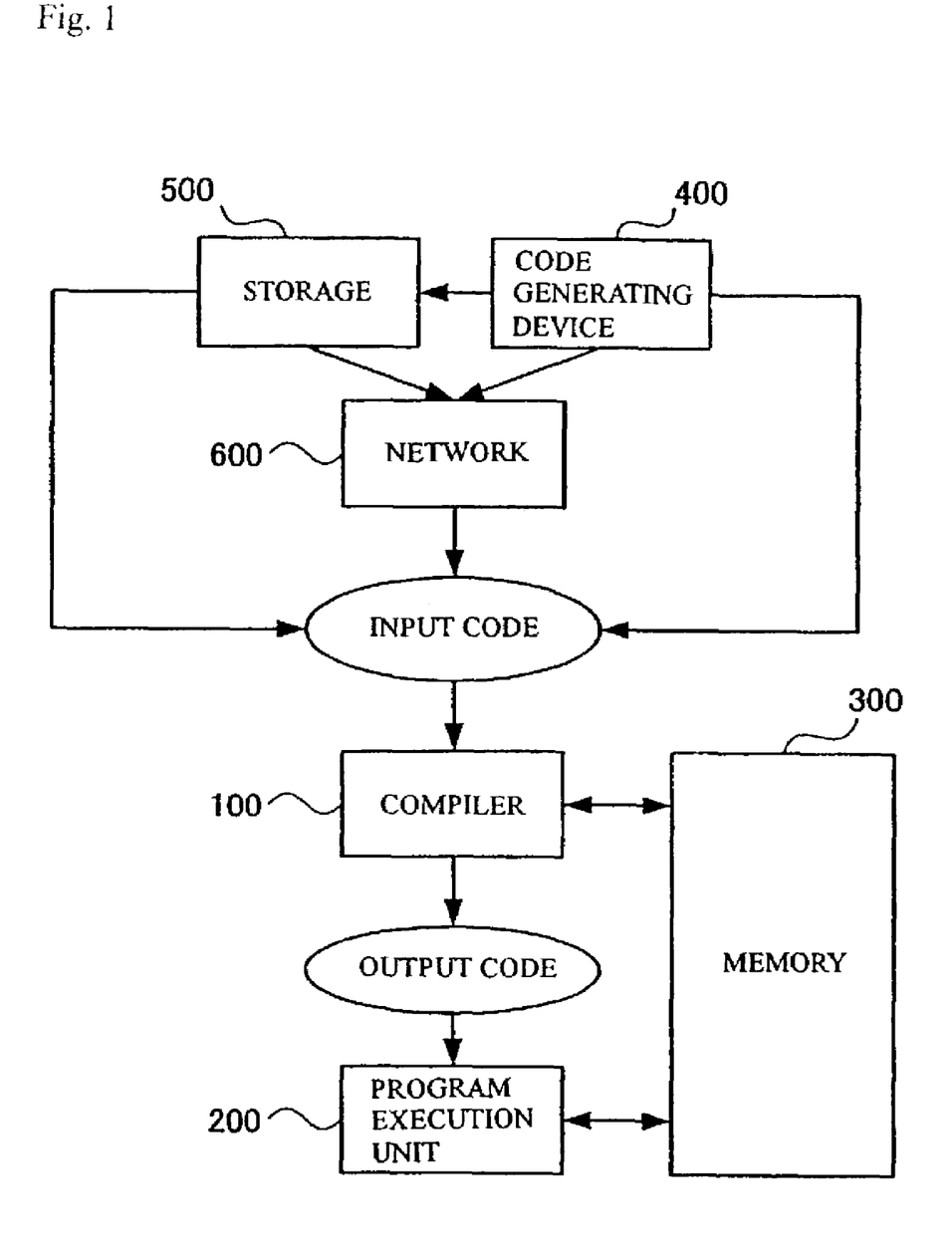
FIG. 1 is a diagram showing an example of a configuration of a computer, which implements a data processing method according to the present invention.

FIG. 1 is a diagram illustrating an example of a configuration of a computer system implementing a data processing according to the present invention. Referring to FIG. 1, a computer system according to the present invention includes compiler 100 for compiling a source program (input code), program execution unit 200 for performing various processes by executing an object program (output code) compiled at compiler 100, and memory 300. Compiler 100 and program execution unit 200 are implemented in a CPU controlled by a program in such a computer system as a personal computer or a workstation. Memory 300 is a main memory of a computer and is implemented as RAM and the like. Memory 300 stores a program for controlling a CPU to operate as compiler 100 or an object program for compiling (referred to as an execution program hereinafter). It is matter of course that a program stored in memory 300 is appropriately saved in a magnetic disc or other external storage when required.

In FIG. 1, compiler 100 enters and processes an input code written in byte code, and then generates and outputs an output code written in machine language. The input code is directly entered an input code generated at code generating device 400, or entered from a storage 500, which stores an input code generated at code generating device 400, or entered over a network 600 from code generating device 400 or storage 500 existing on network 600. The output code generated by compiler 100 is executed at program execution unit 200. In the example embodiment, compiler 100 is a dynamic compiler for performing a compile process of an execution program dynamically in executing an executing program, such as a Java JIT compiler. The embodiment will be described by exemplifying a Java JIT compiler.

In addition to executing an object code (machine code) of an execution program compiled at compiler 100, program execution unit 200 executes the execution program by interpreter. When an execution program is executed, program execution unit 200 obtains the execution file and stores it in memory 300.

Now, a program transformation process by compiler 100, which is implemented in a computer system with the above-mentioned configuration will be described. In an architecture of various CPUs other than 32-bit, such as IA-64 from U.S. Intel Corporation, an explicit insertion of an instruction for adjusting images of local variables of these code columns is required when an execution object of the program transitions between two code columns in different execution environment during running a program, and typically, when the execution object transitions from a code column executed by means of an interpreter to a compiled code column. In this case, effects of optimization are arrested when the program is optimized as it is at compiling by means of a forward dataflow analysis or a UD-chain, as "definitions of a variable" are included in the instructions explicitly inserted. To prevent an explicitly inserted instruction from arresting the effects of optimization, the present invention proposes two embodiments, which will be described in detail below.

First Particular Embodiment

A first particular embodiment identifies an instruction that is ignorable, (an instruction not to be considered) in performing optimization by means of a forward dataflow analysis or a UD-chain among instructions within a basic block (Xfer BB) at a jump-in entry from an interpreter, and calculates a correct set of variables (a KILL set), which cannot be optimized across a junction. Then, at optimization by means of a forward dataflow analysis or a UD-chain, the first embodiment ignores an instruction on variables other than a KILL set (in other words, an instruction which is identified to be ignorable) so that optimization can avoid unnecessary stop. Since there will be inconvenience when all instructions which are identified to be ignorable are simply ignored for propagation of a copy instruction (referred to as appropriate copy propagation hereinafter), thus, calculation is done for each instruction.

Figure 2:
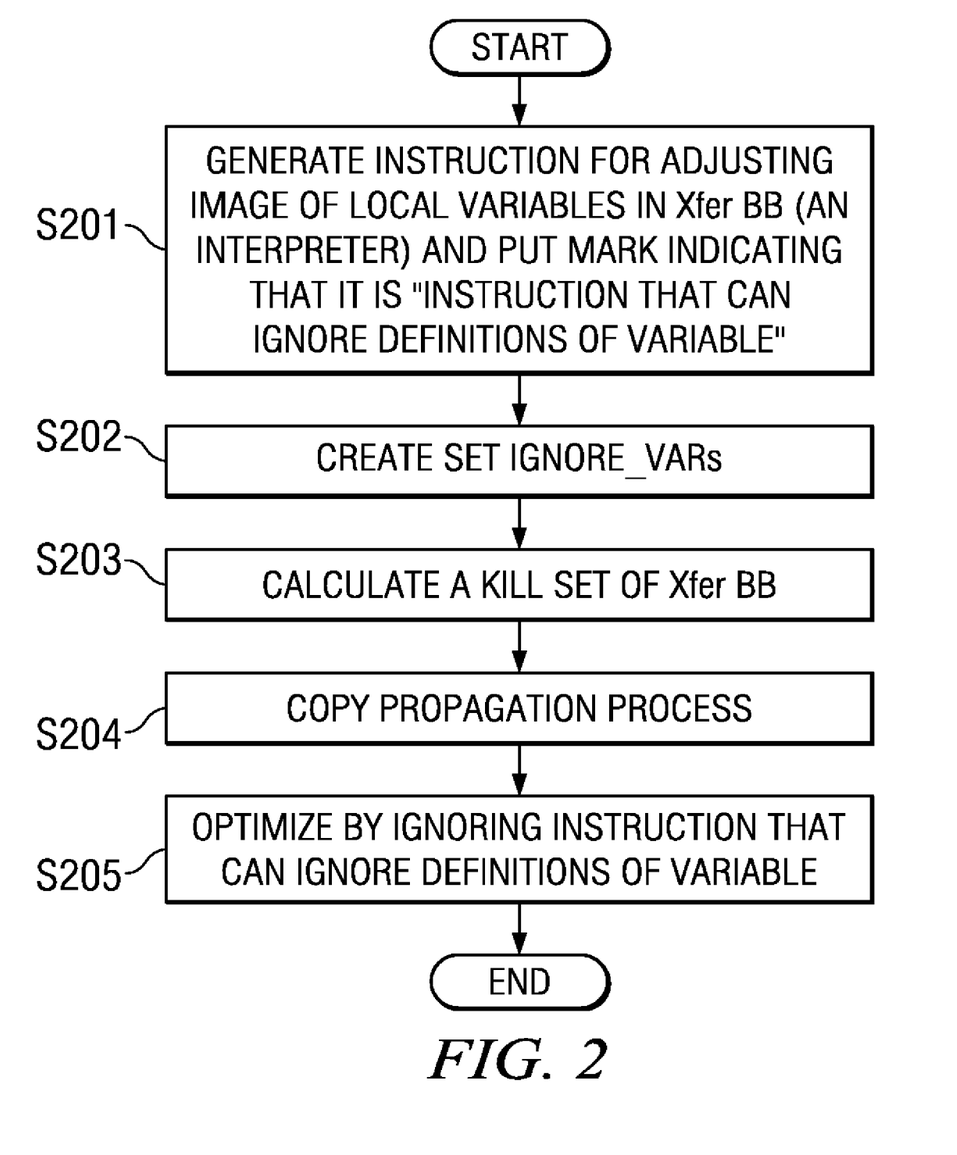
FIG. 2 is a flow chart showing an example of a procedure of optimization in the vicinity of a junction according to the first embodiment.

FIG. 2 is a flow chart for illustrating a procedure of optimization in the vicinity of a junction according to the first embodiment. As shown in FIG. 2, compiler 100 initially generates an instruction for adjusting images of local variables of a code column executed by means of an interpreter within Xfer BB and a compiled code column, while marking the instruction to show that it is an "instruction which can ignore definitions of variables" (step 201). For the purpose of this mark, a generated instruction is added with flag data, with on and off of the flag designating whether it is an "instruction which can ignore definitions of variables" or not.

Compiler 100 also creates a set of variables involved in a marked instruction, i.e., a set of ignorable variables, when it adds a mark to the instruction (step 202). This set is referred to as IGNORE_VARs. The generated set of IGNORE_VARs is stored in memory 300 to be used in the process for calculating the next KILL set. Next, compiler 100 calculates a KILL set of Xfer BB as a preprocess for performing copy propagation in optimization of a program (step 203).

Figure 3:
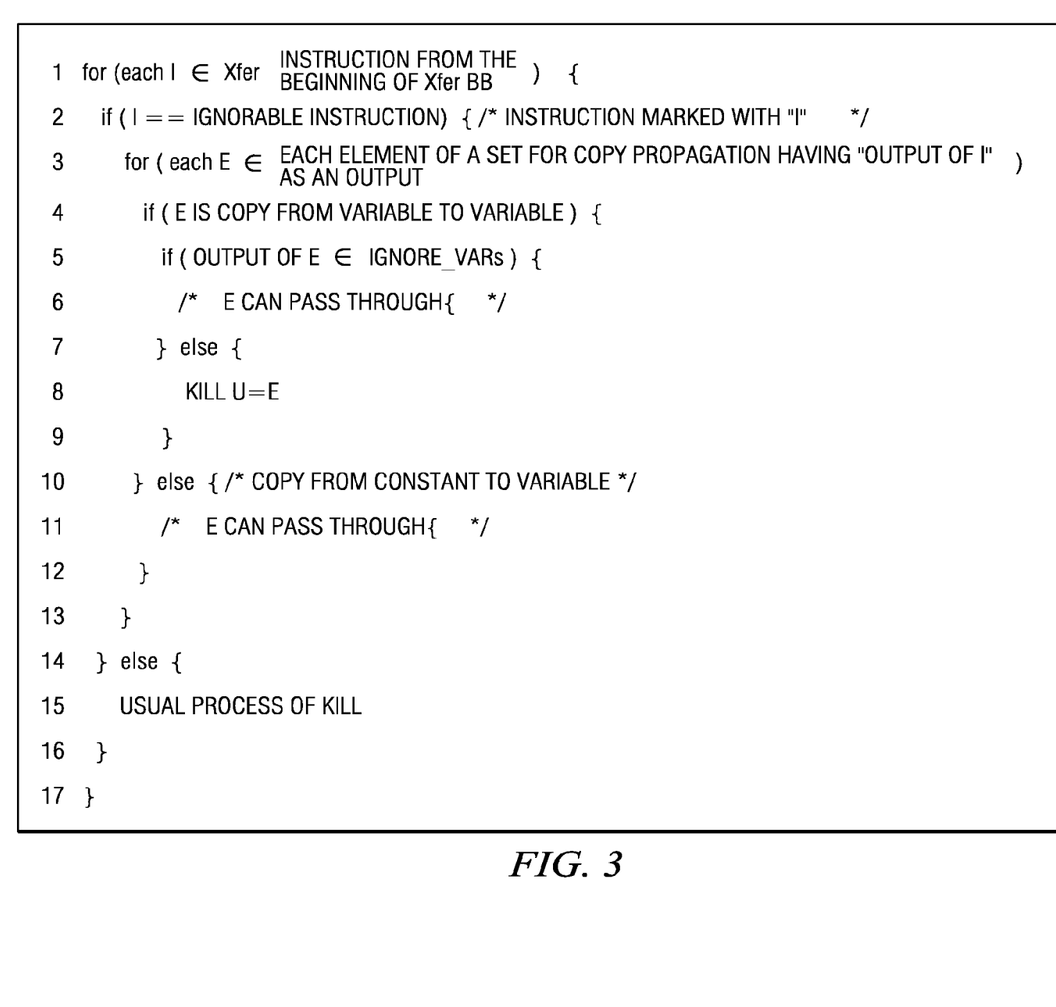
FIG. 3 is a diagram showing an example of a psedecode of a process for finding a KILL set according to the first embodiment.

FIG. 3 is a diagram showing a pseudocode in a process for calculating a KILL set. As shown in FIG. 3, each element E of a set for copy propagation having "Output of I" as an output is calculated for an instruction I, which can ignore definitions of a variable (with the above-mentioned mark) among respective instructions I's from beginning to end of Xfer BB (from line first to third). Then, in the case that a predetermined element E is a copy from a variable to anther variable, and if input of the element E is included in a set IGNORE_VARs held in memory 300, the element E is determined to be able to pass through instruction I (from line fourth to sixth). If it is determined otherwise, the element E is included in a KILL set (line seventh and eighth). If a predetermined element E is a copy from a constant to a variable, the element E is determined to be able to pass through instruction I (line tenth and eleventh). For an instruction I, which cannot ignore definitions of a variable, (an unmarked instruction I), a KILL set is calculated by using usual process.

Compiler 100 performs a typical copy propagation process after the above-mentioned preprocesses (step 204). In other words, compiler 100 cannot propagate across a junction for a copy instruction whose element is a variable included in a KILL set, and propagates a copy instruction whose element is any of other variables by ignoring definitions of a variable.

Then compiler 100 performs optimization by ignoring an instruction, which can ignore definitions of a variable (a marked instruction) in optimization by using a forward dataflow analysis or a UD-chain other than copy propagation (step 205). Next, an object code of the optimized program is generated and stored in memory 300, so that the object code is executed in future execution.

In the above-mentioned manner, compiler 100 can provide program transformation with optimization for more variables by performing determination of whether each instruction and variable can be ignored in copy propagation respectively, and then calculating a correct KILL set, and ignoring only the variables that are ignorable in copy propagation.

An instruction for adjusting images of a local variable of code columns to be inserted into Xfer BB is originally an instruction generated by compiler 100 itself at the process for compiling. This is the reason why compiler 100 can determine in the above step 201 whether an instruction within Xfer BB is an instruction, "which can ignore definitions of a variable" or not.

Figure 4:
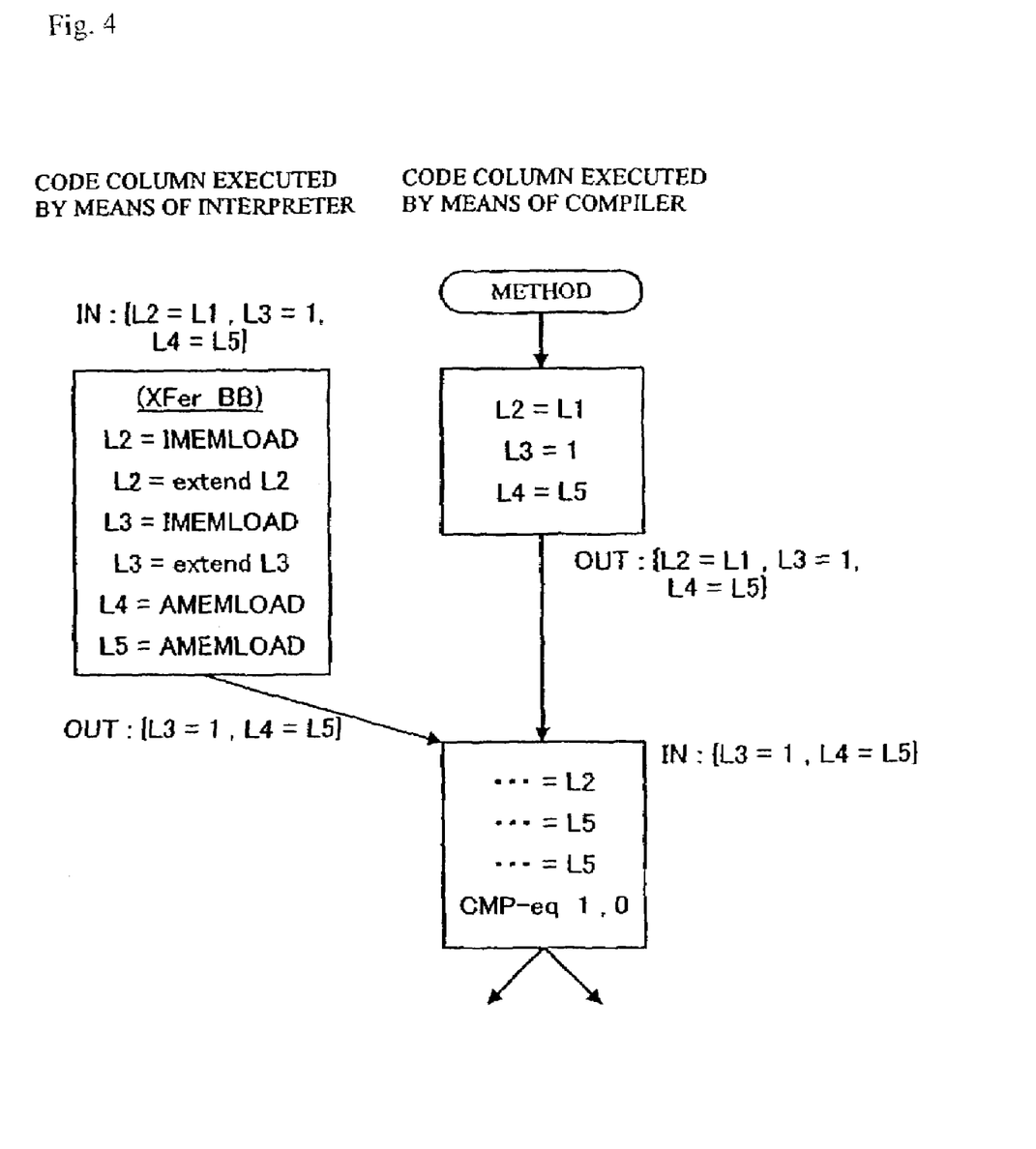
FIG. 4 is a diagram showing an exemplary arrangement of a code column illustrated in FIG. 7 optimized by the first embodiment.

FIG. 4 is a diagram showing an example of code column arrangement shown in FIG. 7 optimized by the embodiment.

In a code column, which is executed by means of an interpreter, "L2=L1, L3=1, L4=L5" is input as information on a copy instruction of a variable in Xfer BB and an instruction for adjusting images of code columns as to L2, L3, L4, and L5 is written in Xfer BB, thus, definitions of a variable can be ignored for variables L2, L3, L4, and L5 (included in a set of IGNORE_VARs). The results of copy instructions "L3=1" and "L4=L5" from the information can be propagated, while a copy instruction "L2 =L1" cannot be propagated because an instruction for adjusting images of code columns as to variable L1 is not written for variable L2 (If the copy instruction "L2=L1" is propagated, the optimization will have a wrong result due to absence of a definition of variable L1).

In the above-mentioned manner, by propagating each result of copy instructions "L3=1" and "L4=L5" in a basic block after a junction, variable L3 appears in the fourth line of this basic block becomes constant 1, so that a choice of this branch hereafter can be eliminated (i.e., optimization can take effect).

Second Particular Embodiment

A second particular embodiment identifies an instruction that is ignorable (an instruction which is not considered) in optimization by means of a forward dataflow analysis or a UD-chain, determines a KILL set, and ignores an instruction for a variable other than one in a KILL set at their optimization as in the first embodiment. The second embodiment can also simply ignore an instruction identified to be ignorable for the propagation of the copy instruction by adding a compensating code for compensating a predetermined copy instruction into Xfer BB. Thus, the optimization can avoid unnecessary stopping.

Figure 5:
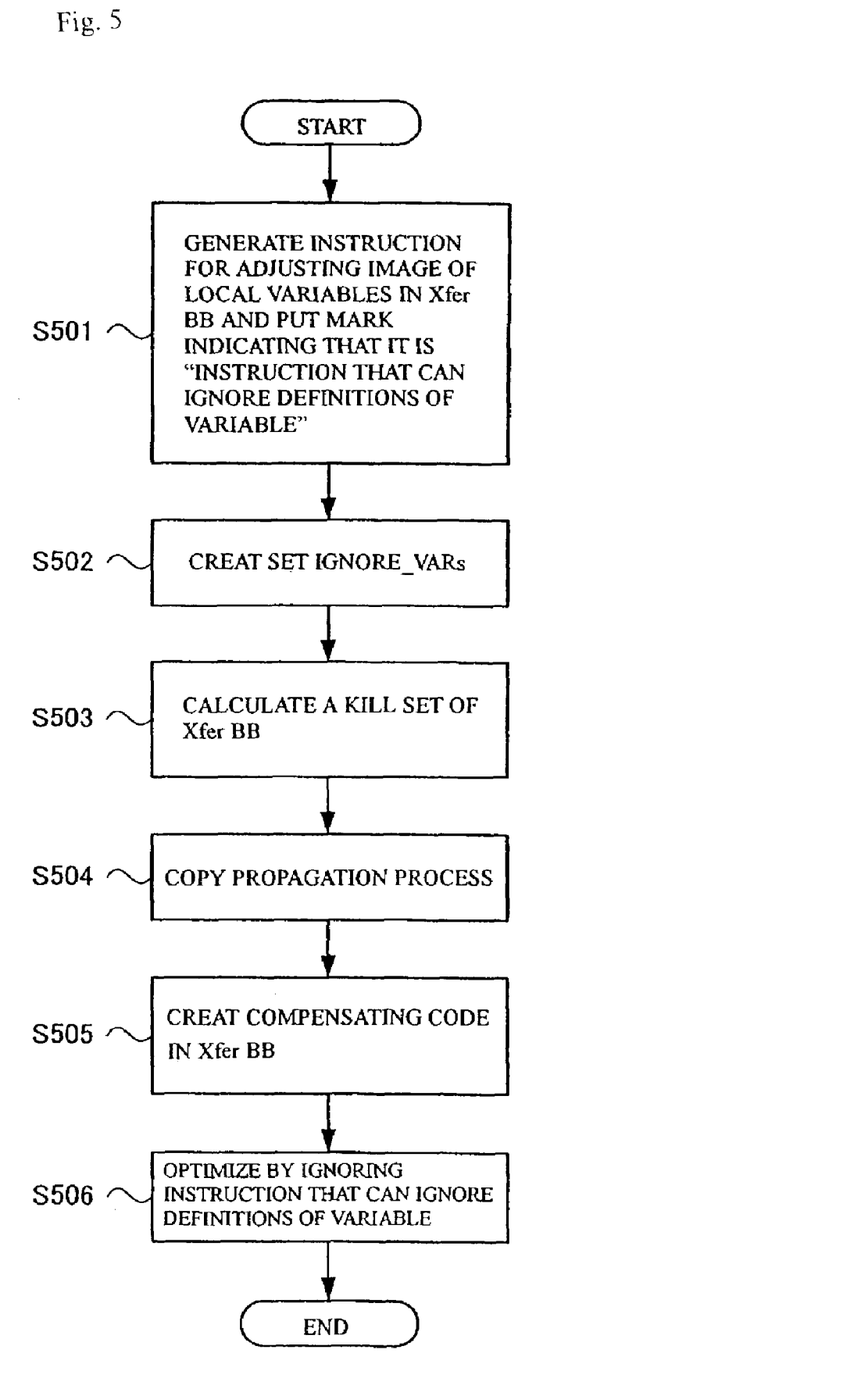
FIG. 5 is a flow chart illustrating an example of a procedure of optimization in the vicinity of a junction according to the second embodiment.

FIG. 5 is a flow chart for illustrating a procedure of optimization in the vicinity of a junction according to the second embodiment. In FIG. 5, processes of steps 501 and 502 are the same as steps 201 and 202 in the first embodiment shown in FIG. 2. Then, compiler 100 of the embodiment calculates a KILL set of Xfer BB by ignoring an instruction, which can ignore definitions of a variable, (the above-mentioned marked instruction) as a preprocess for performing copy propagation in optimizing of a program (step 503). Then, usual copy propagation is performed (step 504).

Next, compiler 100 generates a compensating code within Xfer BB on the basis of input information on a copy instruction of a variable at a junction and a set IGNORE_VARs calculated at step 502 (step 505). More specifically, compiler 100 searches respective element included in input information on a copy instruction of a variable at a junction for a copy instruction, which is a copy from a variable to a variable, and whose output is included in a set IGNORE_VARs, while whose input being not included in a set IGNORE_VARs; generates a copy instruction by inverting input and output the copy instruction as a compensating code; and adds the code to the end of Xfer BB.

Then, compiler 100 performs optimization by ignoring an instruction, which can ignore definitions of a variable (a marked instruction) in optimization by means of a forward dataflow analysis and optimization by means of a UD-chain other than copy propagation (step 506). Then, an object code of an optimized program is generated and stored into memory 300, thus, the object code is executed in future execution.

In the above-mentioned manner, compiler 100 can provide program transformation with optimization for more variables by performing propagation for every copy instruction whose output is included in a set IGNORE_VARS. Effects of optimization is greater in the second embodiment than in the first embodiment, because propagation of a copy instruction is performed by generating a compensating code also for a variable whose definition is not written in Xfer BB in the second embodiment.

Processing cost in executing Xfer BB is higher in the second embodiment, because a compensating code is inserted in the Xfer BB. However, Xfer BB is executed only once when an execution object of a program transitions from a code column executed by means of an interpreter to a compiled code column, and is executed by a compiled code column after the transition, which enhances effects of optimization.

Therefore, efficiency of a program can be improved in general.

Figure 6:
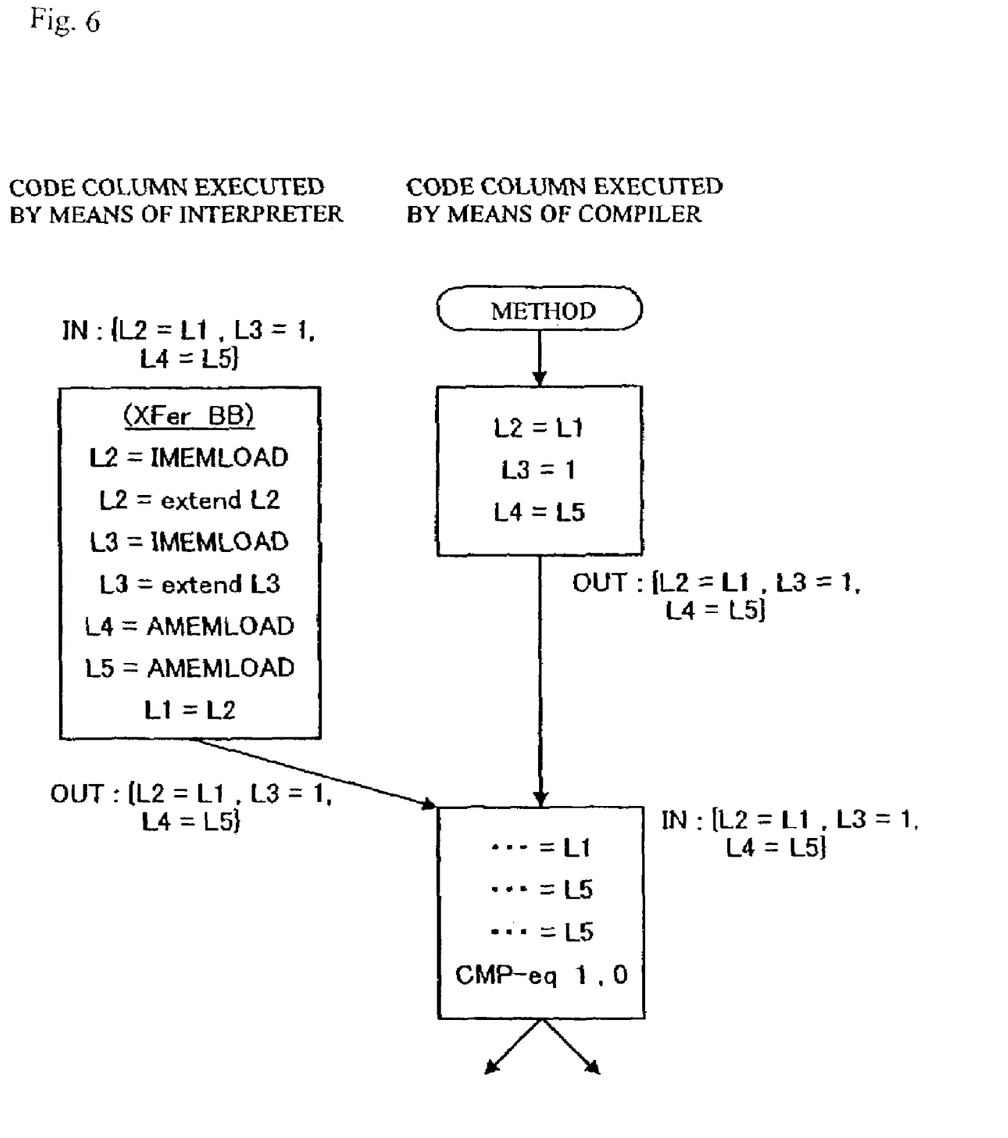
FIG. 6 is a diagram showing an exemplary arrangement of a code column illustrated in FIG. 7 optimized by the second embodiment.

FIG. 6 is a diagram illustrating an exemplary arrangement of a code column shown in FIG. 7 optimized by the embodiment.

In a code column executed by means of an interpreter, "L2 =L1, L3=1, L4=L5" are input as information on a copy instruction of a variable in Xfer BB, and an instruction for adjusting images of code columns is written in Xfer BB for L2, L3, L4, and L5. A compensating code "L1=L2" for a copy instruction "L2=L1", whose output is included in a set IGNORE_VARs and whose input is not included in a set IGNORE_VARs is also written in Xfer BB. This tells that definitions of a variable for variable L1 is the same as that for variable L2, thus, propagation can be performed for each of the copy instructions "L2=L1", "L3=1" and "L4=L5".

In the above-mentioned manner, as a result of propagation of each result of copy instructions "L2=L1", "L3=1", and "L4=L5" in a basic block after a junction, variable L3 appears in the fourth line of this basic bloc becomes constant 1, thus, a choice of this branch after this point can be eliminated (i.e., optimization can take effect).

In the above-mentioned embodiment, description is made for the case that, where an execution object of a program transitions from a code column executed by means of an interpreter to a compiled code column, existence of an instruction for adjusting images of variables of the code columns obstructs optimization. However, the program transformation method according to the embodiment is not limited for the transition from a code column executed by means of an interpreter to a compiled code columns; the method can be adapted to the case where transition is performed between two code columns in different environments.

Instructions and variables that are ignorable in optimization are also not limited to the above-mentioned instruction for definitions of variables: The optimization can avoid to be arrested at a junction of two code columns by setting a instruction or a variable that is ignorable on the basis of appropriate criterion according to a factor such as the type of optimization to be executed for instructions.

Thus, illustrated above, the present invention performs optimization with reduced influence of an explicit instruction for adjusting an image of a local variable of a code column executed by means of an interpreter and a compiled code column. In this way, efficiency of a program can be enhanced.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A program conversion method comprising:
   compiling a program and generating a machine code by controlling a computer when an execution object of said program transitions execution from a first code column executed by means of an interpreter to a second compiled code column, including:
   a first step of setting a first code that is ignorable in a predetermined transformation for the second code column among codes in the first code column, which affects transformation of the second code column and storing the first code into memory; and
   a second step of performing said predetermined transformation for said second code column by ignoring said first code on the basis of said first code stored in the memory, wherein said second step comprises two sub-steps of:
      (i) a first sub-step of determining whether a copy instruction can be propagated across a junction of said first code column and said second code column for each of the codes in consideration of a variable included in the first code ignorable in the predetermined transformation of said second code column; and
      (ii) a second sub-step of performing a transformation of said second code column including propagation of the copy instruction the basis of the step of determining; and
   a third step of generating a compensating code required for transforming the second code column including propagation of a copy instruction, and inserting the code into said first code column prior to the transformation of said second code column, wherein the transformation including said propagation of copy instruction is performed for said second code column by ignoring said ignorable first code in said second step.

2. A computer comprising a compiler for compiling a program, and a program execution unit for executing a program with an interpreter in conjunction with a code compiled by said compiler, wherein when an execution object of said program transitions execution from a first code column executed by means of an interpreter to a compiled second code column during a loop process, said compiler comprises:
   setting means for setting ignorable code being ignorable in a predetermined transformation among codes in the first code column, which affects transformation of the second code column;
   program transformation means for performing said predetermined transformation for said second code column by ignoring said ignorable code, wherein said program transformation means of the compiler determines whether a copy instruction can be propagated across a junction of said first code column and said second code column for each of the codes in consideration of a variable included in ignorable code being ignorable in the predetermined transformation for said second code column and performs transformation of said second code column including the propagation of a copy instruction on the basis of the determination; and
   insertion means of a compensating code for generating a compensating code required for transforming the second code column including propagation of a copy instruction and inserting the ignorable code into said first code column, wherein said program transformation means performs transformation including said propagation of a copy instruction for said second code column by ignoring said ignorable code.

* * * * *